(12) United States Patent
Lotz et al.

(10) Patent No.: US 7,487,427 B2
(45) Date of Patent: Feb. 3, 2009

(54) INTERFACE WORKBENCH FOR HIGH VOLUME DATA BUFFERING AND CONNECTIVITY

(75) Inventors: Marcus Lotz, Saarbruecken (DE); Andreas Guldner, Ueberherrn (DE)

(73) Assignee: SAP AG, Walldorf (DE)

( * ) Notice: Subject to any disclaimer, the term of this patent is extended or adjusted under 35 U.S.C. 154(b) by 760 days.

(21) Appl. No.: 11/028,294

(22) Filed: Jan. 4, 2005

(65) Prior Publication Data
US 2006/0005098 A1    Jan. 5, 2006

Related U.S. Application Data

(60) Provisional application No. 60/623,245, filed on Nov. 1, 2004, provisional application No. 60/583,894, filed on Jun. 30, 2004.

(51) Int. Cl.
*G11C 29/00* (2006.01)
(52) U.S. Cl. .................. 714/763; 714/746; 714/48; 703/25; 726/2
(58) Field of Classification Search .......... 714/48, 714/746, 763; 703/25; 726/2
See application file for complete search history.

(56) References Cited

U.S. PATENT DOCUMENTS

| 5,261,084 | A | * | 11/1993 | Hashiguchi et al. | 714/49 |
| 5,862,363 | A | * | 1/1999 | Taroda et al. | 703/25 |
| 6,473,825 | B1 | * | 10/2002 | Worley et al. | 710/306 |
| 6,715,004 | B1 | * | 3/2004 | Grimsrud et al. | 710/35 |

* cited by examiner

*Primary Examiner*—Guy J Lamarre
(74) *Attorney, Agent, or Firm*—Kenyon & Kenyon LLP

(57) ABSTRACT

The application is directed to the accurate transfer of data. In various methods, systems, and devices of the present invention, a connectivity workbench may be employed to correct errors in data records transmitted between two systems. This workbench may enable real-time manual fixes as well as previously selected automatic fixes. A method that embodies the invention may include receiving a data record, verifying whether or not the data record is error free, correcting the data record and then buffering it until it is needed at a downstream system. In some embodiments, if the downstream system is busy when it receives the data record or if the target location is otherwise occupied, the data record may be returned to the upstream system and then resent at a later time once the error is resolved.

23 Claims, 6 Drawing Sheets

Fig. 5

INTERFACE WORKBENCH FOR HIGH VOLUME DATA BUFFERING AND CONNECTIVITY

This application claims the benefit of provisional application 60/583,894, filed on Jun. 30, 2004, and entitled "Retail Forecast Replenishment Engine." This application also claims the benefit of provisional application 60/623,245, filed on Nov. 1, 2004, and entitled "Flexible and Error Resistant Data Buffering and Connectivity."

FIELD OF THE INVENTION

The present invention regards an error correction method, system or apparatus that may be used to correct errors that arise when data is transferred between two or more systems, computers, or objects. More specifically, the present invention regards a method, system or apparatus that manually or automatically corrects errors in data records received from an upstream data source such that erroneous data records may be corrected or otherwise repaired and the data therein may be buffered or otherwise transferred to a downstream system for subsequent processing or analysis.

BACKGROUND

Sales organizations often gather large volumes of data to analyze and study the progress and operations of their businesses. The data that may be gathered can depend on the specific type of business (i.e., retail, wholesale, etc.), the industry that the business is operating in, and the location of the business.

The analysis that may be performed on the data may vary by business type, business industry, and business location as well. The study may include analyzing sales by product, price, and size; analyzing inventory levels, by product, price, and size; and, analyzing daily operating costs for specific operations, regions or entities.

The accuracy of the analysis being performed depends on the quality of the gathered data. When data is missing or otherwise incomplete, and when it is simply wrong, the subsequent analysis relying upon it can lead to incomplete or inaccurate conclusions.

BRIEF DESCRIPTION OF THE DRAWINGS

FIG. 5 is a graphic user interface as may be employed by an embodiment of the present invention.

DETAILED DESCRIPTION

Embodiments of the present invention can include systems, methods, and apparatus that may be used to fix or otherwise correct data records received from an upstream data source. This correction may include manual fixes carried out by a user and predefined fixes that are carried out automatically after certain predetermined criteria are tested for and met. Once corrected, the data records may be used by a downstream system for subsequent analysis and computation. In certain embodiments, the downstream system may call for data from time to time. This data may be sent or otherwise released to the downstream system at that time.

As explained herein, there are numerous embodiments of the present invention. These include the ones described herein, enhancements and modifications to those described herein, and partial and complete combinations of the embodiments described herein.

Figure 1:
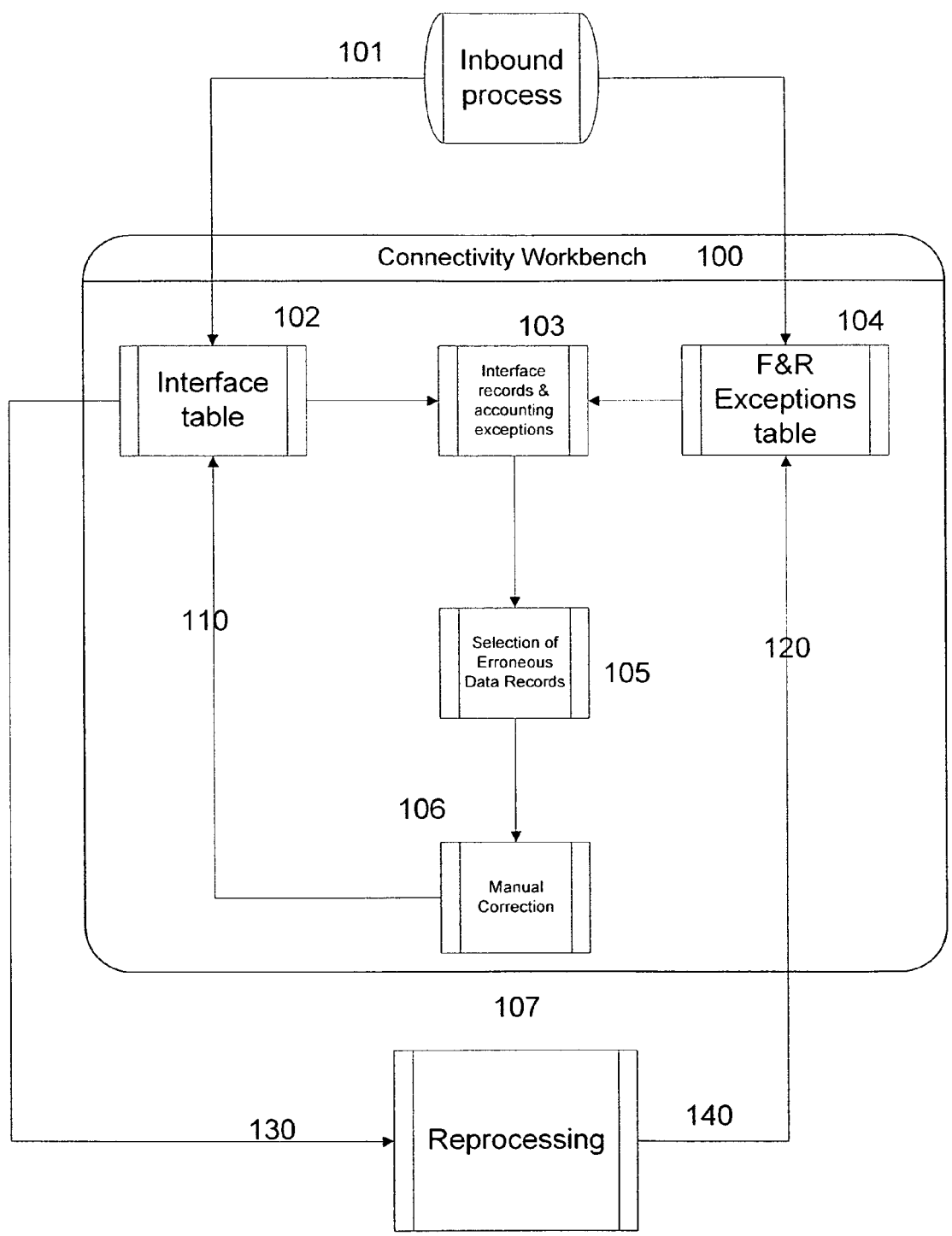
FIG. 1 is an overview of architecture that may be used for a connectivity workbench in accord with the present invention.

FIG. 1 is an overview of an embodiment of the present invention. In FIG. 1, the connectivity workbench 100 is shown interfacing with an upstream inbound process 101 and a downstream reprocessing system 107. The upstream inbound process 101 in this embodiment sends data to two tables within the connectivity workbench, the Interface table 102 and the F&R (Forecast & Replenishment) Exceptions table 104. These tables may receive the data and store it and may also forward the data onto another location for storage, keeping only an indicator of what was in the data and its current location. Once received, the data may be reviewed by the workbench and then fixed prior to it being forwarded on to a downstream system. This fix may include manual real-time fixes performed by an operator of the system as well as automatic fixes based upon instructions input into the workbench and carried out by it.

The Interface table 102 in this embodiment as well as in others may itself be connected to a downstream system such as the Reprocessor 107 shown in FIG. 1. This table 102 may also be connected or otherwise in communication with various internal portions of the workbench 100.

Comparatively, the F&R Exceptions table 104, which may also receive data from Inbound process 101, may not be able to send data to Reprocessor 107. However, unlike the Interface table 107, the F&R Exceptions table 104 may be able to receive communications from the Reprocessor 107. Upon receiving data, the F&R Exceptions table may forward it on for further processing by the workbench 100. This may include gathering interface records and accounting exceptions as shown at 103, selecting erroneous data records as shown at 105, and providing for manual correction of those records at 106. The upstream inbound process 101 may comprise various types of data gathering or data processing systems. These systems can include high volume systems such as POS systems for large retailers and lower volume systems such as payroll systems for small business entities. Moreover, the upstream systems, may comprise a single system as well as a network of systems operating over a wide area network or other functional connection.

The downstream Reprocessor 107 may also be selected from various types of applications and may include both large and small systems and single servers as well as broad networks of computers.

The connectivity workbench 100 in this embodiment may include discrete components that carry out its functionality. It may comprise one processor that is partitioned to carryout all of the workbenches functions as well as several processors in a single system or across multiple systems that carry out the functionality of the workbench. In this embodiment, the workbench 100 has been partitioned to contain two tables, an interface table 102 and an F&R exception table 104, and to run the remainder of the code to carry out the functions of the workbench.

In use, data records may be received by both the Interface Table 102 and the F&R Exceptions table. When these records are identical, as would be the case when the upstream system is sending them, the two tables may store them prior to sending them on. An advantage of receiving data at two locations is that transmission corruption is less likely to occur to the same record being received at both tables. Thus, when the records are gathered at 103, it may be more likely that at least one of the records is complete and may be forwarded on.

At step 103, if duplicate records are received, the copy with the least amount of errors may be forwarded on while the other is discarded. This data record may then be analyzed at 105, to determine if an error in the record exists. If so, the data may be corrected by the workbench at 106 and then sent back to the Interface table 102 for further use. The manual correction 106 may include accepting real-time user input through a Graphic User Interface (GUI) to make the corrections as well as to make pre-programmed changes to the data based upon instructions previously entered by a user.

Alternatively, rather than storing the corrected data records in the Interface table 102, the data record may be stored at a different location, and released by that system to the Reprocessor 107. This release may occur after the connectivity workbench 100 has completed its corrections and has signaled the downstream buffer to send the corrected data record on.

Figure 2:
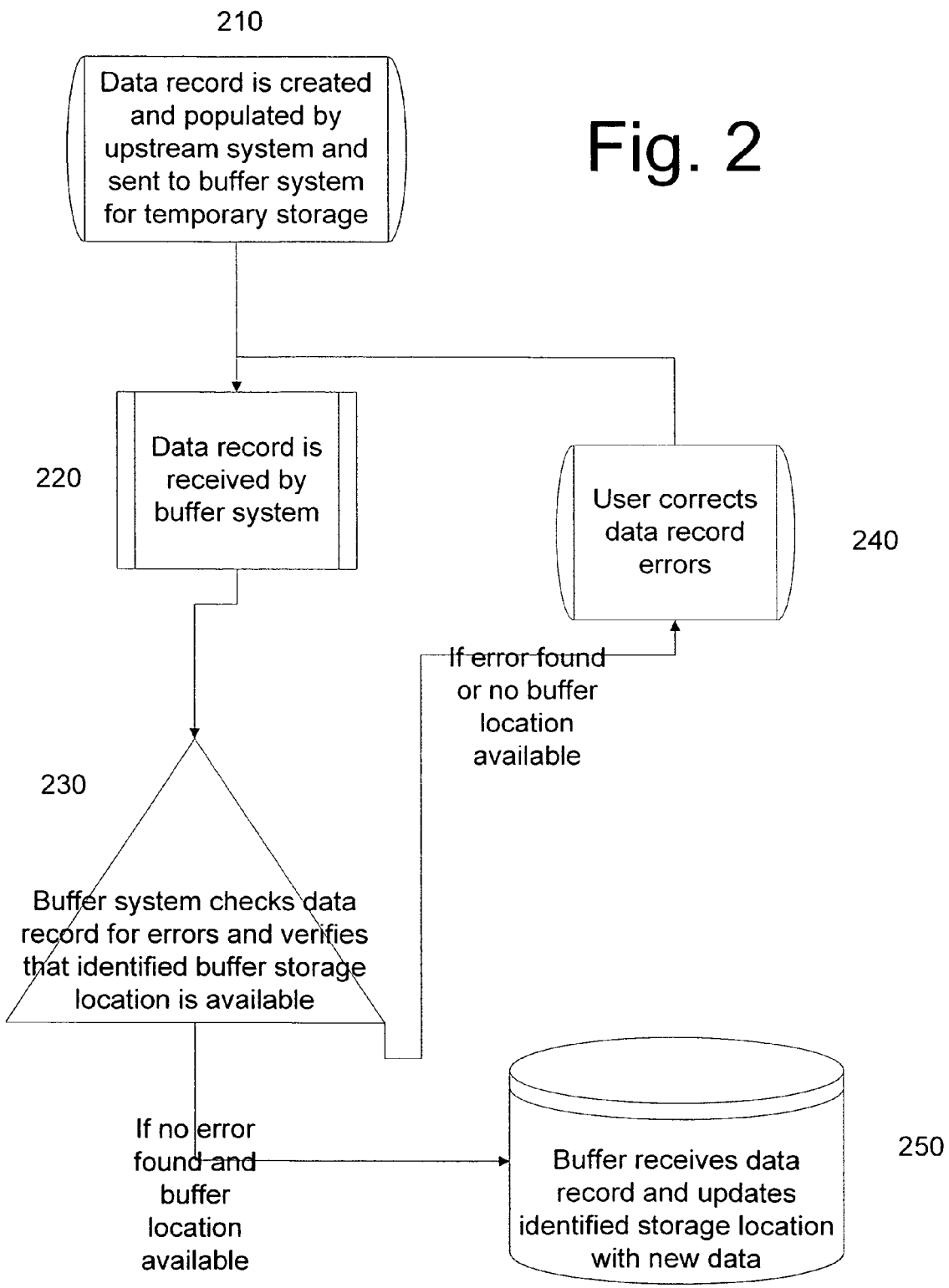
FIG. 2 is a flow chart of a method that may be used in accord with an embodiment of the present invention.
Figure 4:
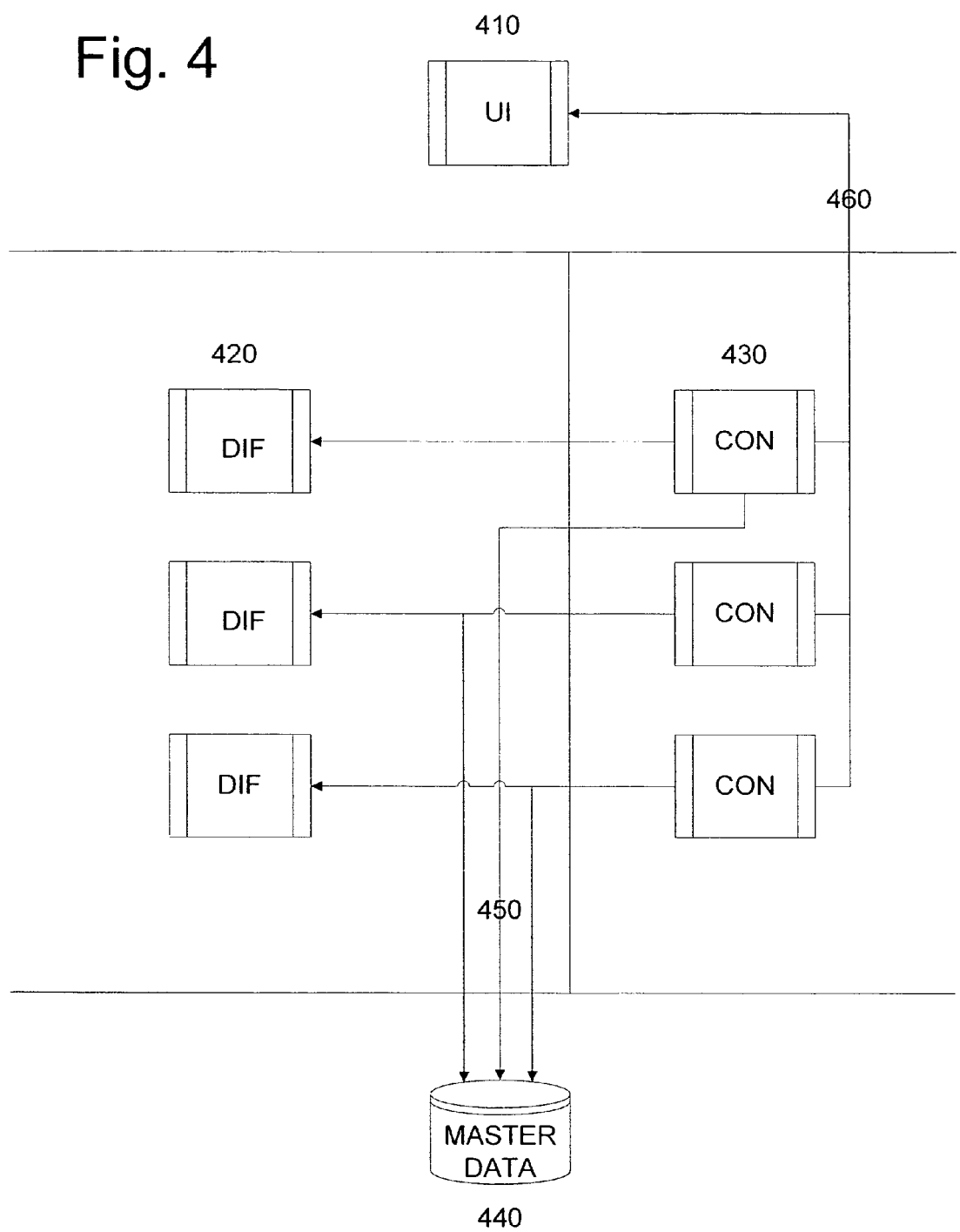
FIG. 4 is a system architecture overview of an embodiment of the present invention.

FIG. 2 shows an overview of a method in accord with an embodiment of the current invention that may be employed using the workbench configuration from FIG. 1 or 4, as well as other configurations. In this method, as shown at 210, a data record may be created and populated by an upstream system prior to it being sent to a buffer system for temporary buffering. This data record may include internal flags that designate the information in the data record as well as the storage position of the data record in the target buffer. At step 220 this data record may be received by the buffer system and, as shown at 230, may be reviewed for errors, such as whether or not the suggested buffer location is able to accept the data record and whether or not the data in the record in consistent with what is expected in the identified data field. If no errors are found and the buffer location is able to accept the data record, the buffer may receive the record and update the identified storage location with the new data. This is shown at 250. Conversely, if an error is found or if the identified buffer location is not able to accept the data record, the record may be held or indexed for manual attention or repair by a connectivity workbench. This is shown at 240. Once the workbench has processed the data record, the data record may be resent to the buffer system and the process may be repeated until the data record is properly sent.

Figure 3:
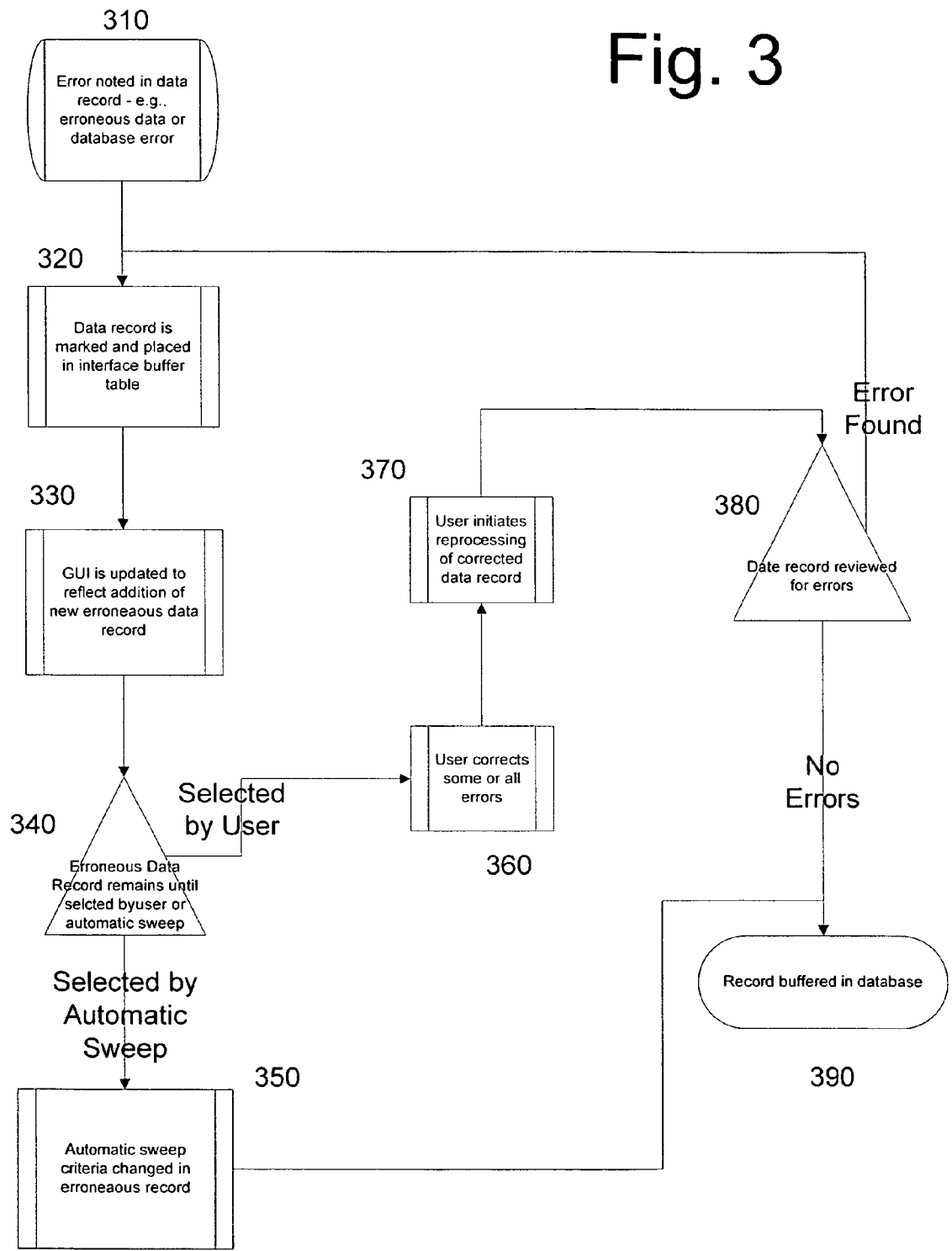
FIG. 3 is a flow chart of a method that may be used in accord with an embodiment of the present invention.

FIG. 3 illustrates a method that may be used in accord with an embodiment of the present invention. This method may begin at step 310 wherein a data record may be received by a processing system. This processing system may recognize that the data record contains an error or that a targeted buffer area is not available to receive the data record. Next, at step 320, the data record may be marked for processing and placed into an interface table. Once placed or marked, a Graphic User Interface (GUI) may be updated to reflect that a new data record has been identified for processing. This step is shown at 330. After the GUI is updated, a user may manually select the record for correction. Alternatively, before or after the GUI has been updated, an automatic sweep may also select the record for correction. This automatic sweep may use criteria for correction previously selected by a user. For example, if a data record is deemed erroneous because the identified location is not available, the automatic sweep may process the data record again if a certain amount of time has lapsed. Likewise, the automatic sweep may also make changes to data fields within the data record, e.g. if a UPC field is incompatible with a product description the UPC field may be deleted or a default number may be inserted. Other automatic changes may be made by the sweep as well.

As shown at 350, if the automatic criteria are satisfied, the erroneous record may be modified and then sent to the buffer 390. Alternatively, if the user selects the data record for manual repair, some or all of the errors may be selected and then corrected as shown at 360 and 370. Once manually repaired, the data record may be reviewed as shown at 380. If errors are found the data record may then be returned to 320 for subsequent processing. If no errors are found the data record may be sent to the database 390 for buffering.

While the data record itself is discussed as being shuttled between locations, other implementations are also considered. For instance, the data record may remain in a single location and may only be moved after a repair is complete. In this way the data record would be viewed or accessed but not moved around until it was repaired by the workbench. Likewise, the data record may be moved about for some of the functions being performed by the workbench but not for others.

The workbench may contain several sub-routines or components that carry out these particular steps. These sub-routines or components may be discrete systems, shared code run by a processor, and combinations of these and other implementations.

Figure 5:
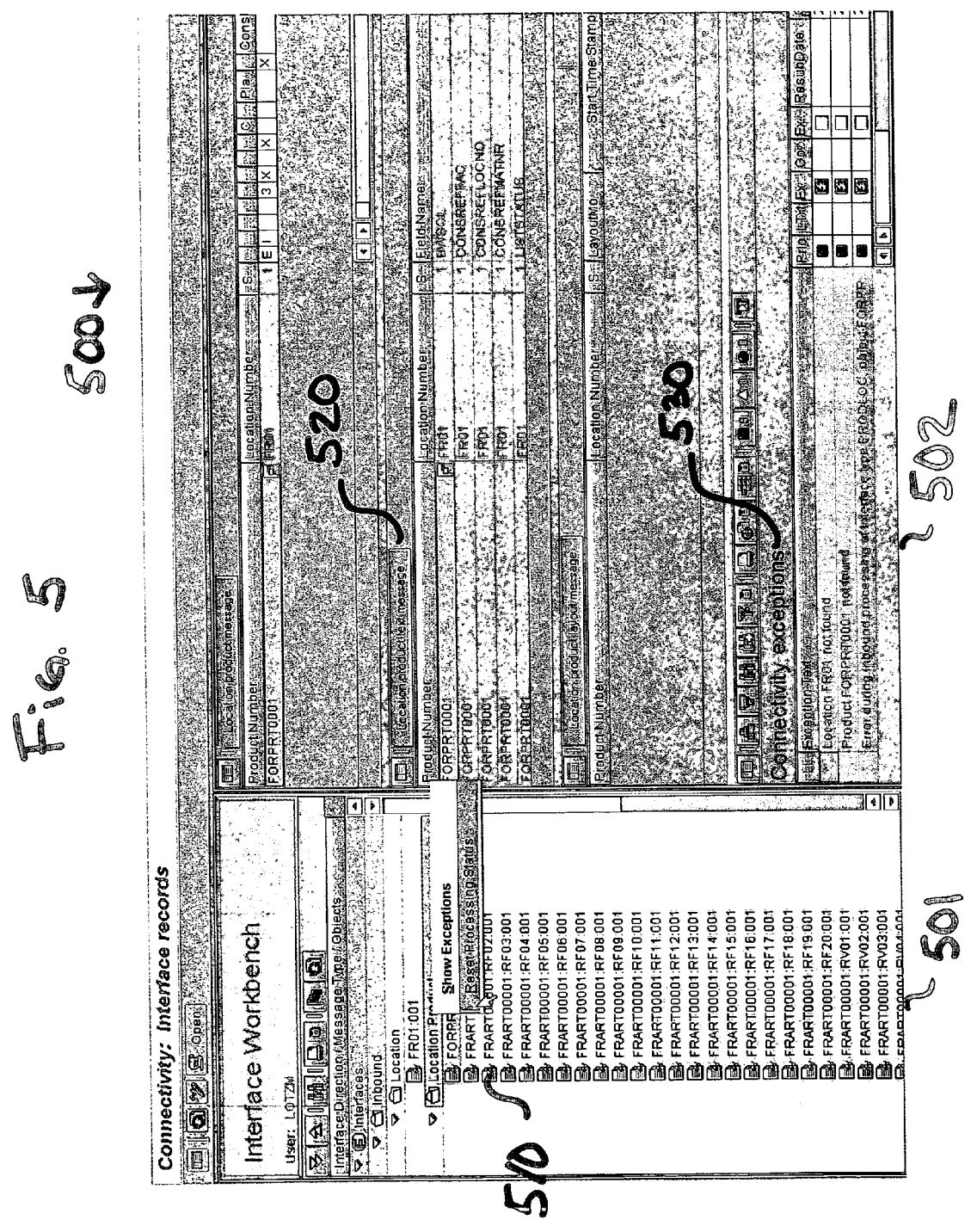

In the embodiment of FIG. 1 the interface table 102 and the exception table 104 may both receive data records from an upstream source. The connectivity workbench 100 may then sort through these tables to identify the accounting exceptions as shown by routine 103. These exceptions may then be selected (as shown in 105) and manual correction of them may be carried out (as shown in 106). A graphical user interface that may be used to make these correction is shown in FIG. 5. Once processed, the data record may then be sent out of the workbench 100 to the Reprocessor 107 as shown by 130. This downstream system may send the data record back to the exception table 104 should the data record contain an error.

FIG. 4 is a model architecture of a connectivity workbench system as may be employed in accord with an embodiment of the present invention. In this embodiment, a user interface layer 410 may be used in conjunction with a function layer 420, a business interface connectivity layer 430, and a database layer 440. Each layer may be run or carried out by different software code. The business interface layer 430 may contain or communicate with the upstream business packages that generate the data records. This layer 430 may also have access to the function layer 420, which may comprise packages that provide access to third party or other software programs that are gathering the data. In this architecture, the layer 430 may gather the raw data from the function layer 420 and then package or otherwise prepare it prior to sending it to the GUI 410 for review. Once reviewed in the GUI 410, the data may return to the database 440 through the layer 430.

FIG. 5 is a Graphical User Interface 500 that may be employed in accord with an embodiment of the present invention. The GUI 500 of this embodiment may include a list of data records 510 that contain errors as well as specific information about a data record that has been highlighted. The GUI 500 may be broken down into two sections: a global section 501, and a specific section 502. The global section 501 may include an overview of the number of erroneous data records as well as a specific list of these records. The specific section 502 may include information about a specific selected data record. This information may include text messages about the record and a list of previously repaired records with similar errors. The GUI may include other data sections as well.

The GUI may also be used to establish the automatic repair functionality of the connectivity workbench identified above. The automatic repair functionality may include ignoring repairs to data records that are only slightly more current than the data record buffered in the downstream system for that location. It may also include auto-complete functionality wherein entries in certain data fields are reentered if the corrupt data appears to be discernable to some degree. The data to filed into these fields may be pre-selected through the GUI. The auto-complete functionality may also include entering default data into erroneous fields, removing data from erroneous fields, and swapping data when certain fields have been mispopulated by the upstream source. There may be other automatic functions as well.

The data record described herein may have numerous configurations. In some embodiments, each record may contain all of the data necessary to be transferred for that record while in other embodiments the data may need to be transferred in several data records. The manner in which the data is divided among these records may depend on how the information is stored in the receiving database. Likewise, the manner in which the data is stored in the record itself may also depend on how the information is stored in the downstream database.

In some embodiments, the data record may be divided into a header section and a trailer section. This header section may include location information, time zone information, coordinates, and language descriptors. The header may also carry information helpful to correct erroneous data carried in the record. This information may be a link or flag to other resources as well as data to substitute for the erroneous record.

Through the use of the buffer and the workbench, the upstream and downstream systems need not communicate directly with each other or even be compatible with each other. Instead, the upstream and downstream systems only need to be able to communicate with the buffer in order to have data or other information catalogued and subsequently retrieved.

The upstream systems may be linked to one another such that they share data and other information between them. They may be wholly independent as well as requiring independent programming and maintenance in order to perform their intended system function. The upstream systems may be previously chosen to gather data that may be important to run a specific organization and business. Likewise, the upstream systems may be used to provide certain data for subsequent downstream analysis, analysis that may be helpful in increasing or otherwise improving the operation of the business.

The downstream systems may be forecast and replenishment systems that help manage the activities of a business or scientific study system that analyzes an experiment or environmental system. Like the upstream systems, the downstream systems, may be linked to one another such that they share data and other information between them. They may be wholly independent as well, requiring independent programming and maintenance in order to perform their intended system function. Moreover, the downstream systems may be previously chosen to gather data that may be important to run a specific organization and business. Likewise, the downstream systems may be used to provide certain analysis for strategic decision making—analysis that may be helpful in increasing or otherwise improving the operation of the business or the understanding of an event. Through the use of the interface buffer it may not be necessary to have the upstream and downstream systems programmed to communicate with each other. Rather, they may be compatible with the interface buffer but not with themselves. In other embodiments, however, the upstream and downstream systems may communicate with each other in addition to using the interface buffer.

In one embodiment, a status flag or other indicator may be placed within or otherwise associated with the data record. This status flag may classify the data record as being an insert record, a delete record or an updated record, the status flags accordingly described as "i-flags" "d-flags" and "u-flags." These flags may be changed by the connectivity workbench to an "e-flag" should an error be detected. Likewise, if the target location is occupied, an "e-flag" may also be assigned to the record. This flag may remain until it is removed by the connectivity workbench when the error is repaired or the target location becomes available.

Figure 6:
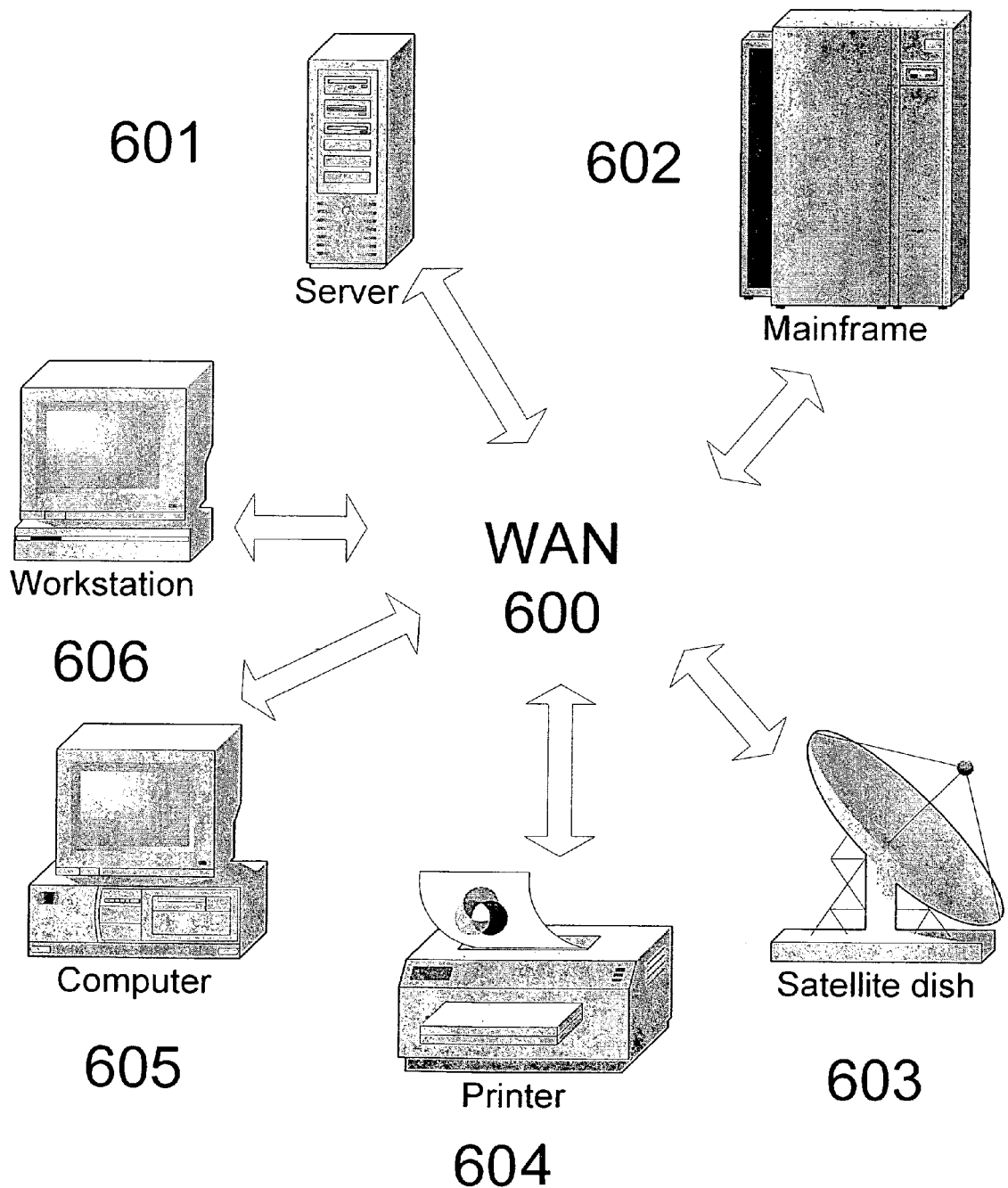
FIG. 6 is a network that may be employed in accord with an embodiment of the present invention.

FIG. 6 is a system that may also be employed in accord with the current invention. This system may include a server 601, mainframe 602, workstation 606, computer 605, printer 604, satellite dish 603, and wide area network 600. In this embodiment, the server 601 may act as the buffer while the mainframe 602 may act as a downstream system for analyzing data buffered by the server. The workstation 606, computer 605, and satellite dish 603 may all be creating and sending data records to the server over the wide area network. The printer 604 may be used to output analyzed data from the mainframe as well as to provide any necessary written outputs from the other devices. The workbench described herein may be run on one or across several of these components.

The present invention may not only include the methods, systems, and devices described above but it may also include derivations of these systems performed in the same order as well as in other sequences. Moreover, in some embodiments, several sequences may be performed at the same time.

What is claimed is:

1. A method for correcting a data record transferred from a data source to a target buffer, the method comprising, at an intermediate entity:

receiving the data record from the data source,
  the data record populated by the data source and containing a status flag,
  the data record identifying a location in the target buffer;
reviewing the data record for errors; and,
if an error is present in the record or if the identified location in the target buffer is not available:
  setting the status flag to indicate an error;
  assigning the record to a correction table; and
  retaining the record at the correction table until the error is corrected or until the indentified location in the target buffer becomes available.

2. The method of claim 1 further comprising:
if the status flag indicates that an error is present in the data record, correcting the error by performing one or more predetermined automatic steps, the predetermined steps selected by a user through a graphic user interface.

3. The method of claim 1 further comprising:
if the status flag indicates that an error is present in the data record, correcting the error by performing one or more real-time changes on the data record, the real-time changes selected by a user through a graphic user interface.

4. The method of claim 1 further comprising:
comparing the received data record with another data record that duplicates the received data record; and
discarding the more corrupted of the received data record and the duplicate data record.

5. The method of claim 1 further comprising:
comparing the received data record with an other data record; and,
if the received data record and the other data record are identical, discarding the received data record or the other data record.

6. The method of claim 1 wherein the data record contains a link to resources to repair errors in the data carried in the data record.

7. The method of claim 1 further comprising:
manually correcting the data record in the correction table.

8. The method of claim 1 wherein the status flag classifies the data record as an insert record, a delete record or an update record.

9. A computer network programmed to perform a method for correcting a data record transferred from a data source to a target buffer, the method comprising, at an intermediate entity:
receiving the data record from the data source,
the data record populated by the data source and containing a status flag,
the data record identifying a location in the target buffer;
reviewing the data record for errors; and,
if an error is present in the record or if the identified location in the target buffer is not available:
setting the status flag to indicate an error;
assigning the record to a correction table; and
retaining the record at the correction table until the error is corrected or until the identified location in the buffer becomes available.

10. The computer network of claim 9, the method further comprising:
if the status flag indicates that an error is present in the data record, correcting the error by performing one or more predetermined automatic steps, the predetermined steps selected by a user through a graphic user interface.

11. The computer network of claim 9, the method further comprising:
if the status flag indicates that an error is present in the data record, correcting the error by performing one or more real-time changes on the data record, the real-time changes selected by a user through a graphic user interface.

12. The computer network of claim 9, the method further comprising:
comparing the received data record with another data record that duplicates the received data record; and
discarding the more corrupted of the received data record and the duplicate data record.

13. The computer network of claim 9, the method further comprising:
comparing the received data record with an other data record; and,
if the received data record and the other record are identical, discarding the received data record or the other data record.

14. The computer network of claim 9 wherein the data record contains a link to resources to repair errors in the data carried in the data record.

15. The computer network of claim 9 wherein the status flag classifies the data record as an insert record, a delete record or an update record.

16. The computer network of claim 9, the method further comprising:
manually correcting the data record in the correction table.

17. A processor programmed to perform steps for correcting a data record transferred from a data source to a target buffer, the steps comprising, at an intermediate entity:
receiving the data record from the data source,
the data record populated by the data source and containing a status flag,
the data record identifying a location in the target buffer;
reviewing the data record for errors; and,
if an error is present in the record or if the indentified location in the target buffer is not available:
setting the status flag to indicate an error;
assigning the record to a correction table; and
retaining the record at the correction table until the error is corrected or until the indentified location in the target buffer becomes available.

18. The processor of claim 17 further programmed to perform the step of:
if the status flag indicates that an error is present in the data record, correcting the error by performing one or more predetermined automatic steps, the predetermined steps selected by a user through a graphic user interface.

19. The processor of claim 17 further programmed to perform the step of:
if the status flag indicates that an error is present in the data record, correcting the error by performing one or more real-time changes on the data record, the real-time changes selected by a user through a graphic user interface.

20. The processor of claim 17 further programmed to perform the step of:
comparing the received data record with another data record that duplicates the received data record; and
discarding the more corrupted of the received data record and the duplicate data record.

21. The processor of claim 17 further programmed to perform the step of:
comparing the received data record with an other data record; and,
if the received data record and the other data record are identical, discarding the received data record or the other data record.

22. The processor of claim 17 further programmed to perform the step of:
prompt a user to manually correct data in the data record in the correction table.

23. The processor of claim 17 wherein the status flag identifies the data record as an insert record, a delete record or an update record.

* * * * *